2 Sheets—Sheet 1.
2235X
D. DEWEY.
SHEARING MACHINE.
Patented Dec. 7, 1814.
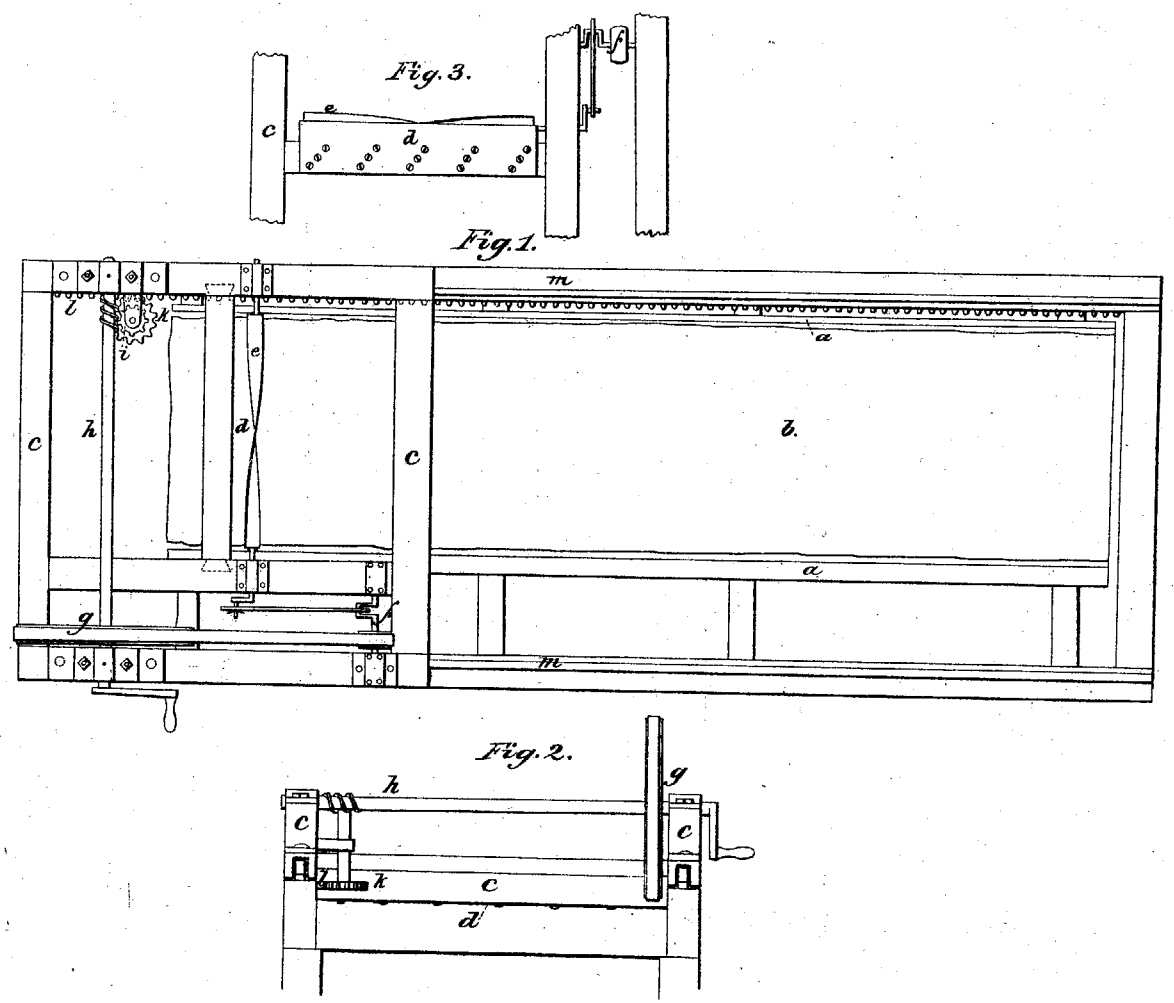
THE NORRIS PETERS CO., PHOTO-LITHO., WASHINGTON, D. C.

2 Sheets—Sheet 2.
2235X
D. DEWEY.
SHEARING MACHINE.
Patented Dec. 7, 1814.
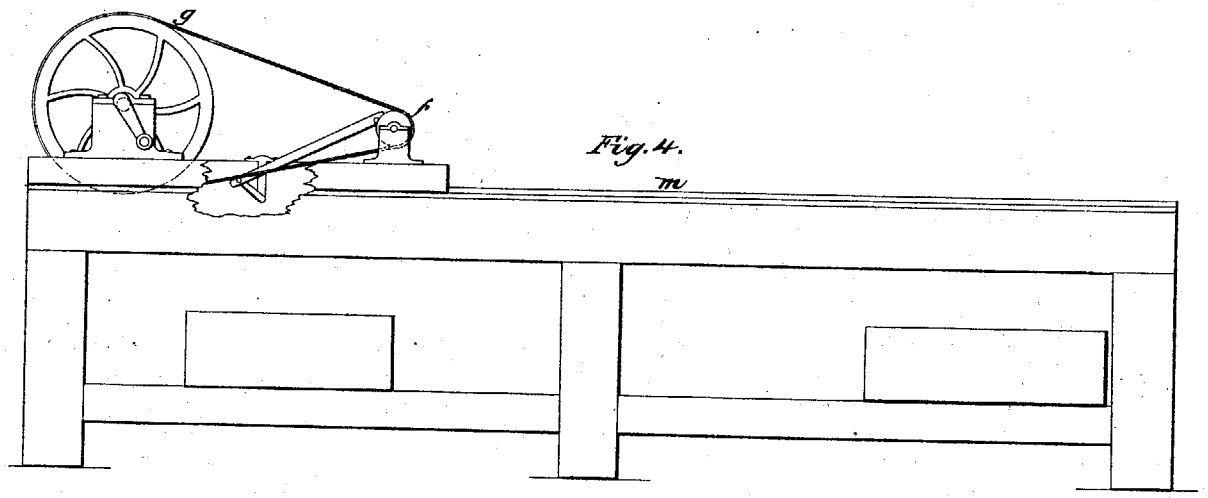
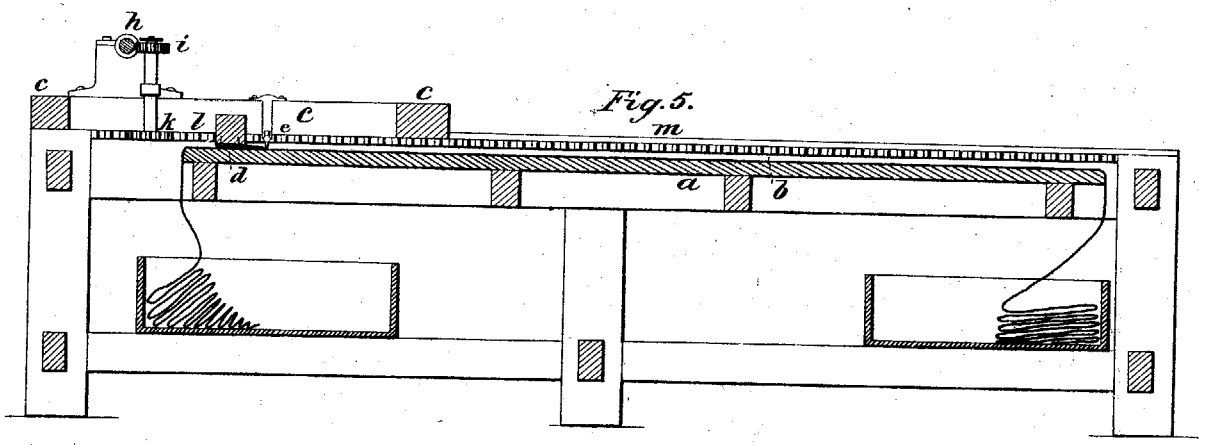
THE NORRIS PETERS CO., PHOTO-LITHO., WASHINGTON, D. C.

Dec 7. 1814 2235x

David Dewey.

Letters Patent.

The Schedule referred to in these Letters Patent and making
part of the same, containing a description in the words of the said David
Dewey himself of his vibrating Shearing Machine.

This machine consists of an oblong frame, within which is a bushion like
one used by clothiers to shear upon with hand shears and the cloth is spread
and tacked upon the bushion in the same manner as tho it were to be
sheared with hand shears. the shears are about two feet long and are
fixed in a frame of about two and a half feet square, with one girth about [illegible] inches
from and parallel with one side of the frame. the under blade of the shears
is horizontal and is screwed on upon the under side of a girth that extends
from the girth first mentioned to the parallel and farthermost side of the frame
the flyer or vibrating blade is suspended over the under blade by pivots at
each end and is pressed down upon the under blade by springs upon
each pivot one pivot extends quite through the first mentioned girth,
it is one and a half inches wide and twisted one quarter or one half round
and is ground only on one edge. It vibrates by the performers turning
a wheel suspended in the first mentioned girth and the nearest in
parallel side of the frame, this wheel with a band turns a [illegible]
upon a crank suspended like the wheel. the crank contains four right angles. a
pitman extends from the middle of the crank to an arm of about two inches long
which is fastened to the end of the flyer i.e to the pivot that extends
through the girth as aforesaid. the crank, the pitman and the arm gives the
upper blade a vibrating motion. This frame is placed upon the first mention-
ed frame or ways and moves crosswise of the cloth at any width by means
of a worm or spire upon the wheel aforesaid which matches and moves a cog
wheel suspended on a perpendicular pin. ~~Here is a small cogwheel on~~
There is a small cog wheel on the lower end of this pin which matches with
pins or teeth fixed in the ways the operation is by turning the wheel afore
said

[illegible]

of a crooked bye & crook. The perpendicular pin or tenon in the upper frame may be made of which material seems the most easy, which can be taken from the wagon gearing and the upper frame may be made to work by hand to its proper place.

Witnesses
Nancies d. Harris
Elisha Ashley

David Drury

[448 Mass